United States Patent [19]
Na

[11] Patent Number: 5,743,148
[45] Date of Patent: Apr. 28, 1998

[54] ENGINE OVER-REVOLUTION PREVENTIVE SYSTEM UTILIZED WITH A MANUAL SHIFT SELECT LEVER ASSEMBLY

[75] Inventor: Sang Pil Na, Kyungsangnam-do, Rep. of Korea

[73] Assignee: Hyundai Motor Company, Seoul, Rep. of Korea

[21] Appl. No.: 684,762

[22] Filed: Jul. 22, 1996

[30] Foreign Application Priority Data

Jul. 22, 1995 [KR] Rep. of Korea .................. 95-21749

[51] Int. Cl.$^6$ ............................................. F16H 61/18
[52] U.S. Cl. ..................................... 74/477; 74/526
[58] Field of Search ........................... 74/477, 526

[56] References Cited

U.S. PATENT DOCUMENTS 4,631,984 12/1986 Jones ............................................. 74/477
5,284,065 2/1994 Loeffler et al. ............................. 74/477
5,388,477 2/1995 Frei et al. ................................. 74/477 X
5,471,893 12/1995 Newbigging ............................. 74/477 X

FOREIGN PATENT DOCUMENTS 5-248536 9/1993 Japan ......................................... 74/477
6-249325 9/1994 Japan ......................................... 74/477

Primary Examiner—Allan D. Herrmann
Attorney, Agent, or Firm—Finnegan, Henderson, Farabow, Garrett & Dunner, L.L.P.

[57] ABSTRACT

An engine over-revolution preventive system utilized with a manual shift select lever assembly provides a shift select lever; a selecting device rotated by a selecting action of the shift select lever; and a control device for allowing the shift select lever to conduct shifting operations only by controlling the selecting device according to the present vehicle speed so as to prevent skip shifting by over-revolution, occurring when a vehicle is travelling at high speeds.

7 Claims, 3 Drawing Sheets

ENGINE OVER-REVOLUTION PREVENTIVE SYSTEM UTILIZED WITH A MANUAL SHIFT SELECT LEVER ASSEMBLY

BACKGROUND

The present invention relates to an engine over-revolution preventive system utilized with a manual shift select lever assembly which can prevent over-revolution that occurs by skip shifting when manually shifting from a high speed to a low speed.

Vehicles in which a manual transmission is equipped have a structure that transmits driving force from an engine by moving a manual shift select lever according to a driving state.

In vehicles having a manual transmission, if a driver does not adequately time his shifting according to the driving state, fuel consumption, engine noise, and hazardous articles contained in the exhaust all can increase.

For example, when driving the vehicle in a state where revolutions per minute(RPM) of an engine, which has high idling of 2500 RPMs, is over 1500 and the shift select lever lies in the fifth speed, if the driver shifts from the fifth speed to the second speed by mistake (and not from the fifth speed to the fourth speed), over-revolution occurs because reverse driving torque is transmitted from the wheels to the engine.

Particularly, in diesel engines, if maximum RPMs is exceeded, the engine can get damaged.

However, because vehicles having the prior manual transmission do not have a device for preventing skip shifting, which is an abrupt shift from a high speed to a low speed, the above problems may occur.

The above phenomenon may occur when a joint part of a trans-mechanism is worn away in vehicles having considerable mileage.

SUMMARY

It is an object of the present invention to provide an engine over-revolution preventive system utilized with a manual shift select lever assembly which can prevent over-revolution that occurs by skip shifting when shifting from a high speed to a low speed.

To achieve the object, the invention provides an engine over-revolution preventive system utilized with a manual shift select lever assembly including a shift select lever; a selector rod connected to the shift select lever, the selector rod being operated by the shift select lever; a shift rod connected to the shift select lever, the shift rod being operated by the shift select lever; a select shaft rotated by a select operation of the selector rod; a first selector member rotated together with the selector shaft, the first selector member connecting to the selector shaft; a second selector member rotated separately or together with the first selector member; a control device for controlling the second selector member.

The engine over-revolution preventive system utilized with a manual shift select lever assembly provides the control device including a vehicle speed sensor (VSS); an electronic control unit (ECU) for comparing signals from the VSS with data predetermined in read only memory (ROM) and judging whether they are over predetermined values; an actuator for allowing the second selector member to move on the control position.

In addition, the engine over-revolution preventive system utilized with a manual shift select lever assembly provides an elastic member disposed between the first selector member and the second selector member.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

A preferred embodiment of the present invention will now be described in detail with reference to the accompanying drawings.

Figure 1:
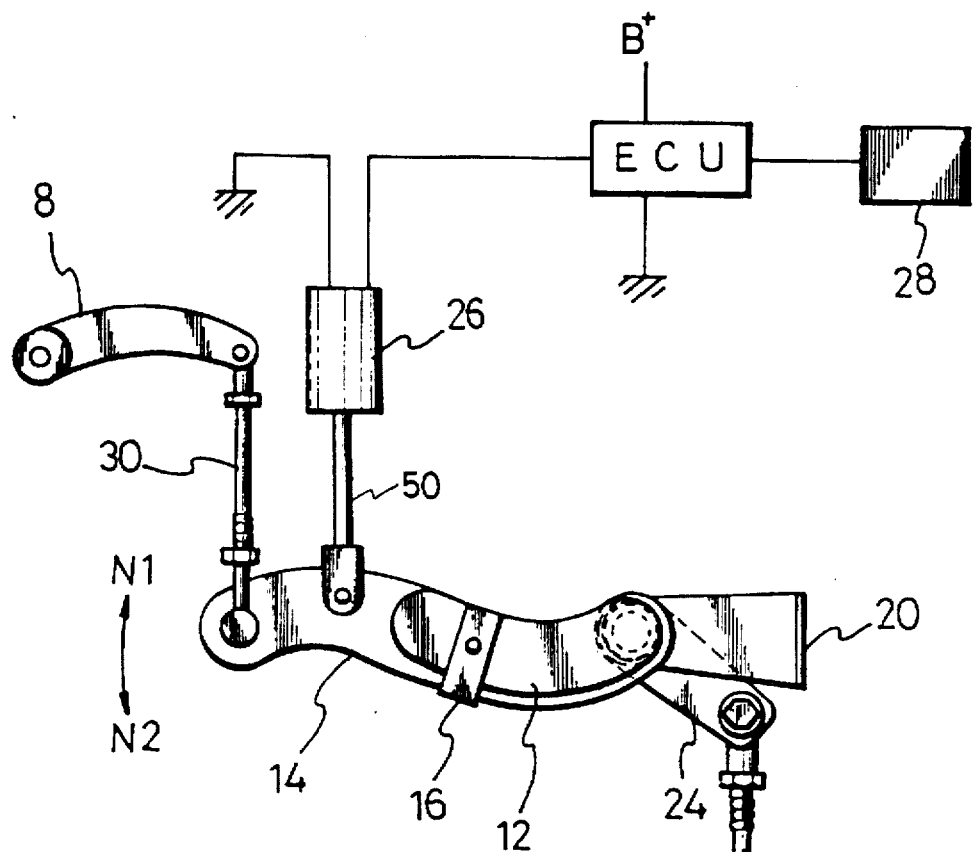
FIG. 1 is a plan view illustrating an engine over-revolution preventive system utilized with a manual shift select lever assembly in accordance with a preferred embodiment of the present invention.
Figure 1:
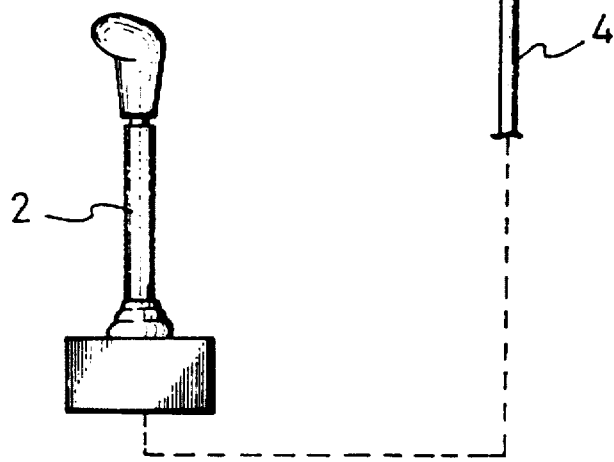
Figure 2:
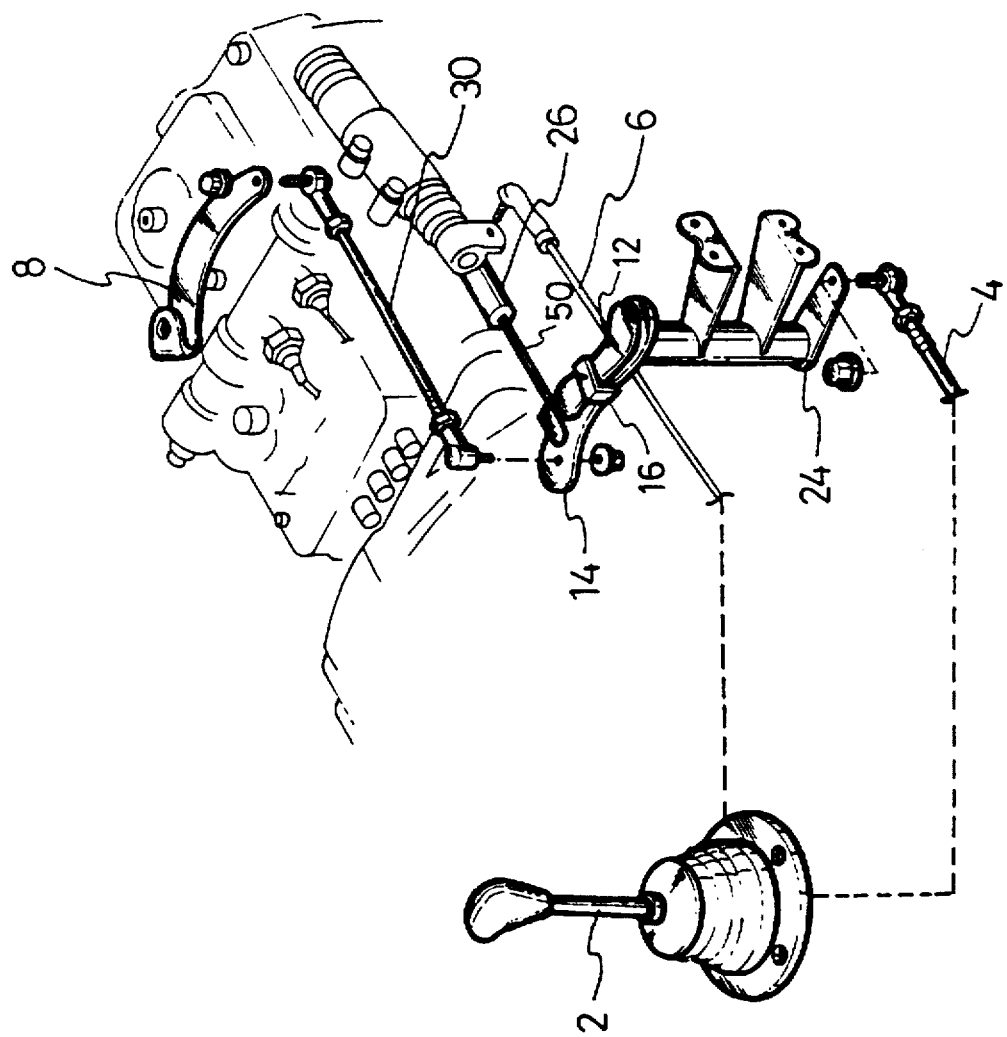
FIG. 2 is a view illustrating an installation state of an engine over-revolution preventive system utilized with a manual shift select lever assembly in accordance with a preferred embodiment of the present invention.

Referring to FIGS. 1 and 2, the reference numeral 2 indicates an ordinary manual shift select lever which is disposed beside the driver seat.

A first selector rod 4 and a shift rod 6 are respectively disposed on the manual shift select lever 2. The first selector rod 4 and the shift rod 6 transmit select and a shift working forces generated by the movement of the manual shift select lever 2 toward a transmission.

The present invention provides a device for preventing erroneous shift selection by the driver by restraining the selector working force as opposed to the shift working force.

The above device is disposed outside the transmission, namely, between the first selector rod 4 and the selector lever 8 for transmitting working force to a cross shaft (not shown) so that it can be rotated.

The preferred embodiment provides a selector working force control device including a selector shaft 10 rotated by the selector working force; a first selector member 12 fixed to one-side end of the selector shaft 10, the first selector member 12 being rotated together with the selector shaft 10; and a second selector member 14 arranged between the first selector member 12 and the selector shaft 10 so as to be rotated.

The first selector member 12 has a stopper 16 for allowing it to rotate together with the second selector member 14 when the selector shaft 10 is operated. A coil spring 18 is provided between the first and the second selector members 12,14 so as to rotate together with the same when the selecting operation is being normally carried out, and only with the second member 14 when the present invention is operated.

A sleeve 19 in which the selector shaft 10 can be inserted is provided in the second selector member 14 so that it allows the second selector member to smoothly rotate around the selector shaft 10.

One end of the coil spring 18 is fixed on the first selector member 12 and the other end is fixed on the second selector member 14.

Figure 3:
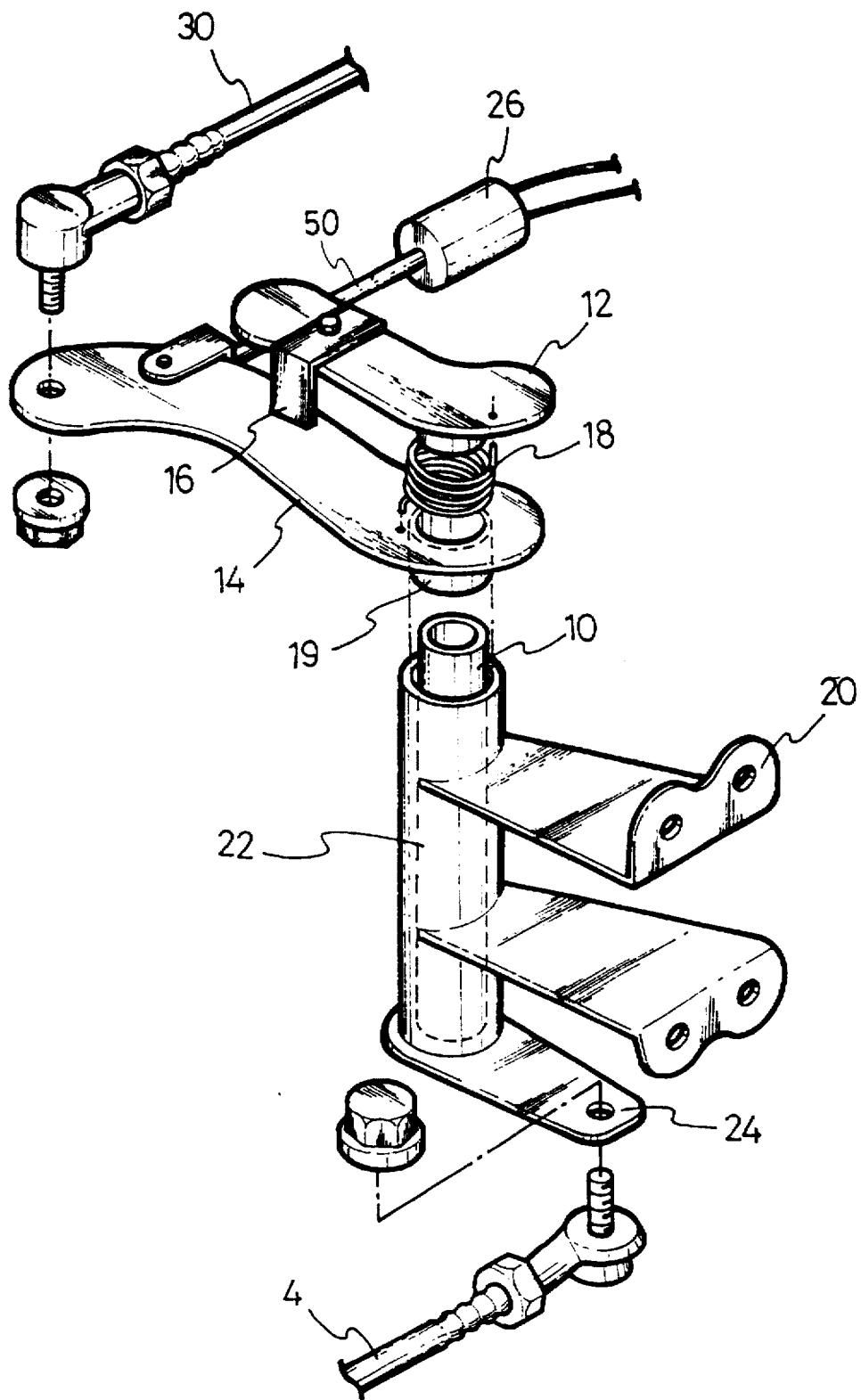
FIG. 3 is an exploded perspective view illustrating main parts of an engine over-revolution preventive system utilized with a manual shift select lever assembly in accordance with a preferred embodiment of the present invention.

Referring to FIG. 3, the selector shaft 10 is illustrated in cutaway state, but it is substantially fixed on the first selector member 12 by combination devices like bolts.

Also, the selector shaft 10 is disposed on a predetermined location by a bracket 20 fixed on the vehicle body (not shown) and a sleeve 22 fixed on the bracket 20.

In the preferred embodiment, the selector shaft 10 is inserted and passed through in the sleeve 22 and a bracket 24 is disposed on one-side end of the selector shaft so as to connect the first selector rod 4.

An operation rod 50 of an actuator 26 is connected to the second selector member 14. This structure allows the actuator 26 to freely pull the second selector member 14.

That is to say, when manually shifting from a high speed to a low speed, the actuator 26 pulls the second select member 14 to prevent skip shifting.

To do this, the actuator 26 is connected to an output terminal of the ECU and a VSS 28 is connected to an input terminal of the ECU.

A solenoid valve may be used as the actuator 26.

A second selector rod 30, which is connected to the shift select lever 8 for directly transmitting the working force of the first selector rod 4 to the transmission is connected to the free end of the second selector member 14.

As described in the above the over-revolution preventive system utilized with a manual shift select lever assembly, if the vehicle is travelling at high speeds when the shift select lever 2 is placed in the fifth speed, the ECU judges the present vehicle speed by signals from the VSS.

Then, the ECU compares the present vehicle speed with the standard value predetermined in the ROM. If the speed is over than the value, the ECU outputs control signals to the actuator 26.

Because the actuator 26 pulls the second selector member 14 by the control signals, the second selector member 14 is rotated toward the N1 direction, as shown FIG. 1, centering on the selector shaft 10 so that the selecting operation is controlled by its rotation when moving the manual shift select lever 12.

Figure 4:
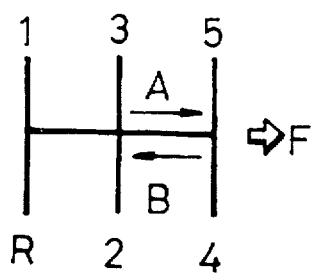
FIG. 4 is an view illustrating movement ranges for a shift select lever of vehicles on which an engine over-revolution preventive system utilized with a shift select lever assembly is installed.

Referring to FIG. 4, the shift select lever 2 can not be moved toward the A direction and B direction.

Accordingly, the shift select lever 2 can be moved only from the fifth speed to the fourth speed and skip shifting from the fifth speed to the second speed can not be done.

In addition, when the present vehicle speed is lower than the predetermined speed, the actuator 26 allows the second selector member 14 to lie in a free state as the ECU intercepts signals that are being transmitted to the actuator 26. Finally, in the above state, the shift select lever can be moved to other low speed positions.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. An engine over-revolution preventive system utilized with a manual shift select lever assembly comprising:

a first selector rod connected to the shift select lever, the first selector rod being operated by the shift select lever;

a shift rod connected to the shift select lever, the shift rod being operated by the shift select lever;

a selector shaft rotated by the selecting operation of the first selector rod;

a first selector member rotated together with the selector shaft, the first selector member being connected to the selector shaft;

a second selector member selectively coupled to the first selector member for rotation therewith;

a second selector rod for transmitting the selecting operation of the second selector member to a transmission; and a control device for controlling the second selector member.

2. The engine over-revolution preventive system utilized with a manual shift select lever assembly of claim 1, wherein the control device comprises a VSS; an ECU for comparing signals from the VSS with predetermined values stored in a ROM and judging whether the signals are over the predetermined values; and an actuator for allowing the second selector member to move on the control position.

3. The engine over-revolution preventive system utilized with a manual shift select lever assembly of claim 1, wherein the selector shaft is disposed inside a sleeve fixed on a vehicle body so as to be able to be rotated.

4. An engine over-revolution preventive system utilized with a manual shift select lever assembly comprising:

a shift select lever moved to each shifting position by a driver;

a selecting device rotated by a selecting action of the shift select lever; and a control device which limits the shifting operation of the shift select lever by controlling one portion of the selecting device selectively coupled to another portion of the selecting device according to the present vehicle speed.

5. An engine over-revolution preventive system utilized with a manual shift select lever assembly comprising:

a first selector rod connected to the shift select lever, the first selector rod being operated by the shift select lever;

a shift rod connected to the shift select lever, the shift rod being operated by the shift select lever;

a selector shaft rotated by the selecting operation of the first selector rod;

a first selector member rotated together with the selector shaft, the first selector member being connected to the selector shaft;

a second selector member selectively coupled to the first selector member;

a second selector rod for transmitting the selecting operation of the second selector member to a transmission;

a control device for controlling the second selector member; and an elastic member disposed between the first selector member and the second selector member.

6. An engine over-revolution preventive system utilized with a manual shift select lever assembly comprising:

a first selector rod connected to the shift select lever, the first selector rod being operated by the shift select lever;

a shift rod connected to the shift select lever, the shift rod being operated by the shift select lever;

a selector shaft rotated by the selecting operation of the first selector rod;

a first selector member rotated together with the selector shaft, the first selector member being connected to the selector shaft;

a second selector member selectively coupled to the first selector member;

a second selector rod for transmitting the selecting operation of the second selector member to a transmission;

a control device for controlling the second selector member;

the first selector member having a stopper for moving the second selector member to a position of the first selector member.

7. An engine over-revolution preventive system utilized with a manual shift select lever assembly comprising:

a shift select lever moved to each shifting position by a driver;

a selecting device rotated by a selecting action of the shift select lever; and a control device which limits the shifting operation of the shift select lever by controlling the selecting device according to the present vehicle speed;

wherein the selecting device comprises a selector shaft rotated by the selecting action;

a first selector member rotated together with and according to the rotation movement of the selector shaft; and a second selector member disposed between the first selector member and the selector shaft, the second selector member being rotated by an elastic member disposed between the first and second selector members, and the second selector member transmitting the selecting movement to the selector lever of a transmission.

* * * * *